US006993073B2

(12) United States Patent
Foong et al.

(10) Patent No.: US 6,993,073 B2
(45) Date of Patent: Jan. 31, 2006

(54) OPTIMIZATION SOFTWARE MODULE AND METHOD FOR VIDEO COMPRESSION UNDER MPEG

(76) Inventors: James Foong, P.O. Box 5220, South San Francisco, CA (US) 94083; Steven Toy, 723 Widgeon St., Foster City, CA (US) 94404

( * ) Notice: Subject to any disclaimer, the term of this patent is extended or adjusted under 35 U.S.C. 154(b) by 247 days.

(21) Appl. No.: 10/397,147

(22) Filed: Mar. 26, 2003

(65) Prior Publication Data

US 2004/0190612 A1   Sep. 30, 2004

(51) Int. Cl.
    *H04B 1/66* (2006.01)
(52) U.S. Cl. .......................... 375/240.03; 375/240.28; 375/240.26; 375/240.01; 382/235; 382/251; 704/501; 704/504
(58) Field of Classification Search .......... 375/240.03, 375/240.26, 240.28, 240.02, 240, 240.01, 375/240.24; 382/251, 232, 246, 235, 239; 704/501, 504
See application file for complete search history.

(56) References Cited

U.S. PATENT DOCUMENTS

| | | | | |
|---|---|---|---|---|
| 6,058,143 A | * | 5/2000 | Golin | 375/240.16 |
| 6,167,084 A | * | 12/2000 | Wang et al. | 375/240.02 |
| 6,470,048 B1 | * | 10/2002 | Fenne | 375/240 |
| 6,516,029 B1 | | 2/2003 | Wang | |
| 6,574,274 B2 | * | 6/2003 | Obata et al. | 375/240.03 |
| 2002/0071663 A1 | * | 6/2002 | O'Donnel | 386/109 |
| 2003/0161542 A1 | * | 8/2003 | Ridge | 382/246 |
| 2004/0075750 A1 | * | 4/2004 | Bateman | 348/231.1 |

* cited by examiner

*Primary Examiner*—Shawn S. An
(74) *Attorney, Agent, or Firm*—C. P. Chang; Joe Zheng

(57) ABSTRACT

An MPEG Optimization Software (MOPSW) for maximizing a Video Compression Ratio (VDCR) while maintaining a good output Video Image Quality (VDIQ) of an Input MPEG file (IMPEG) is disclosed. The IMPEG has a set of adjustable MPEG Control Parameters affecting both its VDCR and VDIQ. In a specific embodiment with application to MPEG2 files, the MOPSW employs the following optimized set of adjustable MPEG Control Parameters:

Set Video Size=(x)×(Minutes of Video) where x=12 through 18;

Maximum BITRATE=2200 through 3300;

Maximum Average BITRATE=2200; and

Minimum BITRATE=300 and achieved a VDCR that is at least 200% higher than what is typically available from current DVD suppliers in the art while maintaining a good output VDIQ for a representative set of movie titles. An associated method of iteratively determining the optimized set of adjustable MPEG Control Parameters is also presented.

18 Claims, 1 Drawing Sheet

OPTIMIZATION SOFTWARE MODULE AND METHOD FOR VIDEO COMPRESSION UNDER MPEG

FIELD OF INVENTION

This invention is related to the field of video image compression. More specifically, the invention is directed to a new optimization software and associated method applicable to the industry standard video compression algorithm under Motion Picture Experts Group (MPEG), a family of international standards used for coding audio-visual information in a digital compressed format.

BACKGROUND OF THE INVENTION

Over the past ten years, the fast expansion and evolution of all kinds of digital media has brought with it significant advancement and standardization of, among other things, the MPEG video compression algorithm and associated file format for a corresponding saving in content storage and delivery bandwidth. The MPEG family of standards includes MPEG-1, MPEG-2 and MPEG-4, respectively formally known as ISO/IEC 11172, ISO/IEC-13818 and ISO/IEC-14496. Chronologically, MPEG1 was introduced in 1988 with a data rate 1.5 Mb/sec (Megabits/sec) and primarily used for VCD applications; MPEG2 was born in early 1990s with a data rate >3.0 Mb/sec and used extensively for multimedia applications; MPEG4 was introduced in 1995 for video based applications; and, currently, MPEG7 is the latest technology and used for video database applications.

Of particular importance is the by-now commercially well accepted industry standard MPEG2. In fact, as the MPEG2 has been so stabilized in terms of adoption by the mass market, in addition to numerous software tools being made available for its implementation, there were also emergence of corresponding integrated Circuits (IC) performing such related functions in hardware. One example is the M65727FP MPEG2 MOTION ESTIMATION LSI made by Mitsubishi Electric Corporation.

A commonly accepted measurement of the effectiveness of a video compression algorithm when applied to a video title is Video Compression Ratio (VDCR), defined as follows:

VDCR=Raw Data/Encoded Data

Where Raw Data, expressed in Gigabytes (GB), is the total amount of digital data required to store the video title at a fixed image display resolution with no video compression. For example, under an NTSC standard, the fixed image display resolution for a consumer-quality video is 352×240 pixels. After the compression by the video compression algorithm, the same video title now only requires Encoded Data, also expressed in GB, for storage. It follows that a more effective video compression algorithm should provide a higher VDCR. Of course, as always, all applications of any video compression algorithm must produce a corresponding Video Image Quality (VDIQ) that is acceptable and should be as good as possible. Under a typical application of MPEG2, a VDCR in the range of 20–30 is achievable with acceptable VDIQ.

Upon closer inspection of the MPEG2 specification, however, it is noticed that significant latitude in the selection of mode of compression and recommended range of compression control parameters is available for a set of parameters called MPEG2 Control Parameters (MPCP). For convenience of illustration, the MPCP, typically adopted by current DVD suppliers in the market, are presented in TABLE I below together with their mode and range of compression.

TABLE I

Typical MPEG2 Control Parameters (MPCP)

| MPCP | Typical range adopted by current DVD suppliers |
|---|---|
| Set Video Size used by DVD: (x Value) × (Minutes of Video) | 35–50 × (Minutes of Video) likely set via file size of a DVD title |
| Maximum BITRATE used by DVD | 7500–15000 |
| Maximum Average BITRATE/Average BITRATE used by DVD | Average BITRATE 4000–9500 |
| Minimum BITRATE used by DVD | 0 |

While TABLE 1 illustrates the mode and range of compression generally associated with the MPCP typically adopted by current DVD suppliers, little is revealed as to how such range is ultimately selected for the MPCP to achieve a higher VDCR with a desirable VDIQ. In particular, little has been shown as to how the VDCR and VDIQ of a video title could be affected when the corresponding MPCP is adjusted in a systematical and simultaneous manner.

Significantly, it is found by the present invention that as the value of MPCP is adjusted within their adopted ranges according to TABLE I, the VDCR and VDIQ of the resulting MPEG2 file exhibit a correspondingly significant variation according to the present invention. Even more surprisingly, drastic improvement of the VDCR has been observed from certain out-of-range adjustments of the MPCP.

Therefore, by systematically and simultaneously adjusting the MPCP, an opportunity exists for simultaneous achievement of a significantly higher VDCR than that is available from the current DVD suppliers in the art while still maintaining a comparable or even achieving a better VDIQ.

SUMMARY OF THE INVENTION

Thus, a first object of this invention is to achieve an optimization software and method for achieving a VDCR significantly higher than what is available from the current DVD suppliers in the art.

A second object of this invention is to achieve the said significantly higher VDCR while achieving a comparable or better VDIQ than what is available from the current DVD suppliers in the art.

Other objects, together with the foregoing are attained in the exercise of the invention in the following description and resulting in the embodiment illustrated in the accompanying drawings.

BRIEF DESCRIPTION OF DRAWINGS

The current invention will be better understood and the nature of the objects set forth above will become apparent when consideration is given to the following detailed description of the preferred embodiments. For clarity of explanation, the detailed description further makes reference to the attached drawing herein.

DETAILED DESCRIPTION OF THE PREFERRED EMBODIMENTS

Figure 1:
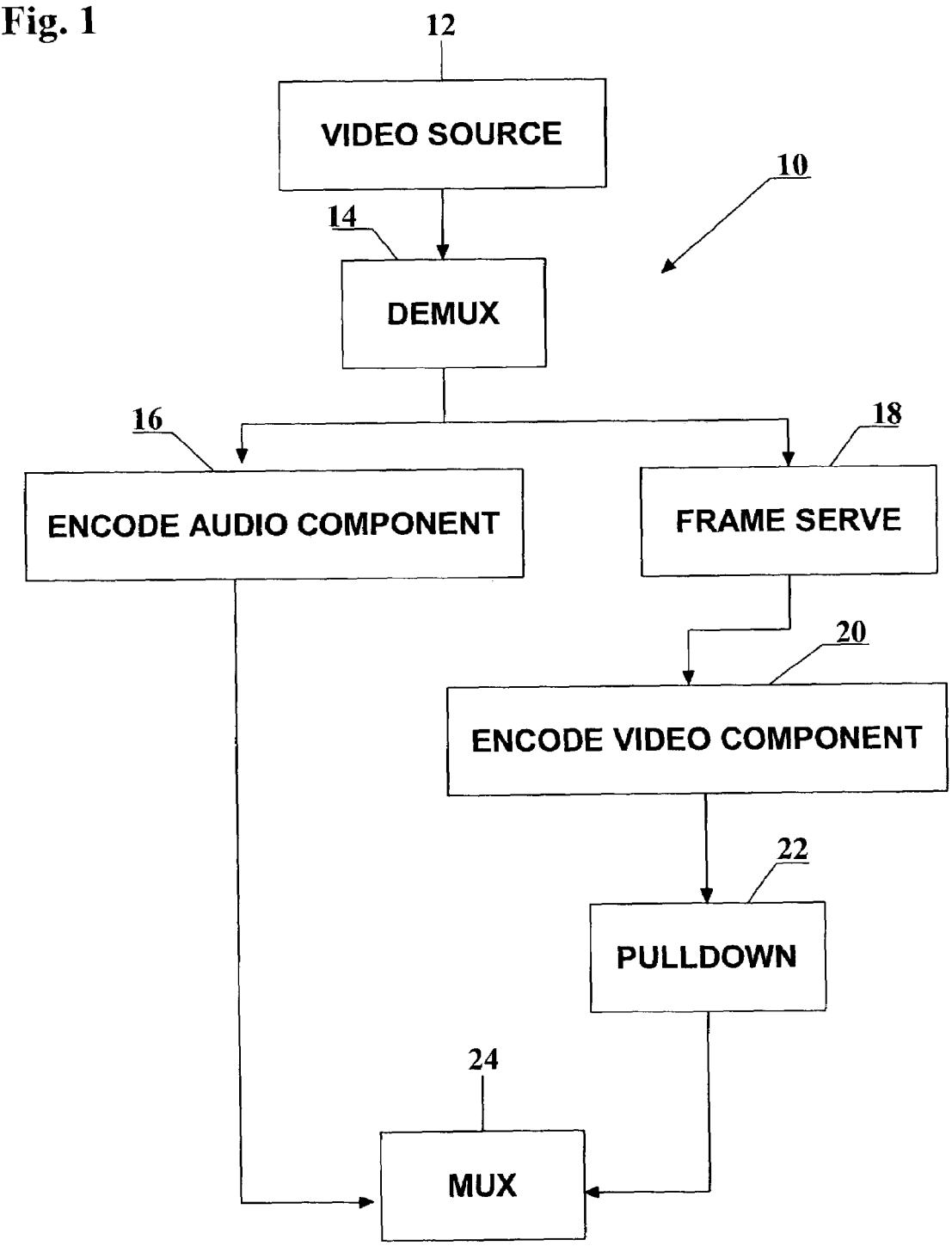
FIG. 1 shows the flow chart of optimization software of the present invention.

In the following detailed description of the present invention, numerous specific details are set forth in order to provide a thorough understanding of the present invention. However, it will become obvious to those skilled in the art that the present invention may be practiced without these specific details. In other instances, commercially available softwares, methods and procedures have not been described in detail to avoid unnecessary obscuring aspects of the present invention. The detailed description is presented largely in terms of flow charts and other symbolic representations. These descriptions and representations are the means used by those experienced or skilled in the art to most effectively convey the substance of their work to others skilled in the art.

Reference herein to "one embodiment" or an "embodiment" means that a particular feature, structure, or characteristics described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations of the invention.

Glossary of Abbreviations

The abbreviations used in this invention, wherever as applicable, have the following definitions and meaning:

AC3 (Audio Coding 3) means a third generation audio coding algorithm of Dolby Lab, which is a perceptual coding algorithm developed to allow the use of lower data rates with a minimum of perceived degradation of sound quality;

AVI (Audio Video Interleave) is a common video file encoding format signified by a file extension of ".avi" and its associated video quality can be very good at lower resolutions except that the file sizes tend to be rather large;

BICUBIC means a method used for video encoding, which is the slowest encoding method but produces the best estimation of a new pixel value;

BILINEAR is another method for video encoding with the following characteristics (i) it is computationally cheap to implement while resulting in a low quality texture filtering; (ii) it approximates the gaps between textures by sampling the color of the four nearest (above, below, left and right) pixels and (iii) all modem 3D accelerated video cards can do BILINEAR filtering in hardware with no performance degradation;

BITRATE is a term often used for describing video or audio quality and defines how much memory one second of audio or video takes in bits;

CBR (Constant Bitrate) is a term used to describe how video and audio are encoded and under the CBR scheme, BITRATE remains at a constant level throughout the encoding of an audio or video title;

Codec has the meaning of compression and de-compression;

DEMUX is also known as Demuxing or Demultiplexing that refers to an action whereby a video data stream is split into separate component data streams (video/audio/subtitle);

DVD (Digital Video Disc) is also known as Digital Versatile Disc;

D2v is a file format used by DVD2AVI;

FRAME means an individual, instantaneous picture image out of a strip of motion picture film, the same as one complete screen on videotape;

FRAME RATE means the frequency at which a film or video FRAME runs and can be expressed in terms of frames per second (fps) such as 30 fps or in terms of Hz such as NTSC having a FRAME RATE of 29.97 Hz and PAL having a FRAME RATE of 25 Hz;

GUI means Graphic User Interface;

MPEG (Moving Picture Experts Group) is an industrial standard algorithm employed by a hardware codec for compressing and decompressing video files; since an MPEG codec still generates large file sizes, MPEG is best suited for applications involving CD-ROM, NTSC or PAL and the current MPEG standards include the following: (i) MPEG1—that provides consumer-quality video at ¼ broadcast quality with a display resolution of 352×240 pixels at 29.97 fps; and (ii) MPEG2—that provides broadcast-quality video at full-motion quality with a display resolution of 704×480 pixels at 30 fps;

MUX is also known as Multiplexing that refers to an action whereby separate component data streams (video/audio/subtitle) are synchronously rejoined to form a complete video data stream;

NTSC (National Television Standards Committee) is responsible for setting television and video standards in the United States (in Europe and the rest of the world, the dominant television standards are PAL and SECAM); the NTSC standard for television defines a composite video signal with a refresh rate of 60 half-frames (interlaced) per second and each frame contains 525 lines and can contain 16 million different colors.

PAL (Phase Alternating Line) is the dominant television standard in Europe; while NTSC defines 525 lines of resolution at 60 half-frames per second, PAL defines 625 lines at 50 half-frames per second and many video adapters that enable computer monitors to be used as television screens support both NTSC and PAL signals;

RFF means Repeat First Frame, it is a technique used to make the necessary final frame rate of 29.97 frames per second out of an otherwise 24 frames per second source on which the movie was originally recorded; movies that are encoded using the RFF flag use each RFF flag to inform the player to repeat one field, that is, to add one frame rate-compensation frame, etc;

TFF (Top Field First) is another technique used to perform a frame rate-compensation operation called TELECINE to make a 24 fps movie into a 29.97 fps for final playing; specifically, cinematic film movies are shot at a speed of 24 progressive frames per second (a frame is the smallest data unit of a 24 fps FILM format); on the other hand, NTSC video is a "field-based" format with 59.94 fields per second (a Field is the smallest data unit in the NTSC interlaced video format). Since two (2) fields make up one (1) frame, 59.94 fields per second is equivalent to 29.97 frames per second, which creates a problem characterized by the play time as 1 second in FILM (24 frames) is NOT equal to 1 second in NTSC Video (29.97 frames). To be able to match the playtime of an NTSC Video, conversion from a FILM format to an NTSC Video format includes a process called "2:3 pull down", or TELECINE is required. Thus, explained in simplest terms, TELECINE means "to add 6 frames per second so that a 24 fps source format becomes a 30 fps object format" that is now close enough to the desired 29.97 fps;

SIMPLE means a method used for video encoding to compress large picture files;

VBR (Variable BITRATE) is a term used to describe how video and audio are encoded and is the opposite of CBR; under the VBR scheme, BITRATE continuously changes between high and low throughout the encoding of an audio or video title;

VCD means Video CD that uses MPEG1 technology;

SVCD stands for 'Super Video CD' that is very similar to a VCD, it has the capacity to hold about 35–60 minutes on 74/80 min CDs of very good quality full-motion MPEG-2 video along with up to 2 stereo audio tracks and also 4 selectable subtitles; a SVCD can be played on many standalone DVD Players and of course on all computers with a DVD-ROM or CD-ROM drive with the help of a software based decoder/player; and VOB (DVD Video Object) is a Core data files found in DVD video discs that contain actual data for a movie.

Referring now to FIG. 1, the flow chart of an MPEG optimization software 10 of the present invention is shown. As the focus of the present invention is on the adjustment, and related method, of the value of MPCP to achieve a significantly higher VDCR than what is available from the current DVD suppliers in the art by employing commercially available, off-the-shelf software products as the building blocks of the MPEG optimization software 10, the description of the MPEG optimization software 10 will be focused primarily upon the overall flow and the inter-block relationship amongst the building blocks. In Video Source 12 a variety of composite video source files, each having a synchronous audio component and a synchronous video component, are provided for further optimization. Some example file formats of these composite video source files are AVI, MPEG2 and VOB with VOB files typically found in a DVD video disc that contains actual data for a movie, called a title. Next, a Demux 14 operation separates the composite video source file from Video Source 12 into its audio component file and its video component file. An example format of the audio component file is AC3. An example format of the video component file is D2v. By way of illustration and not limitation, the following are some examples of the commercial, off-the-shelf software products employed to implement Demux 14 according to the invention: MPEG Recorder (sold by Honestech's Digital River Inc, 9625 West 76$^{th}$ Street, Suite 150, Eden Prairie, Minn. 55344); M2 Edit Pro (sold by Mediaware Solutions, 401 Clunies Ross Street, Acton, ACT 2601 Australia); or Womble MPEG2VCR (sold by Womble Multimedia, 20333 Bollinger RD, Santa Clara Calif.).

The audio component file from Demux 14, for example an AC3 file, is then further compressed by Encode Audio Component 16 from a range of 128 to 224 BITRATE. Typically a further compression ratio of 2X is achieved. The following are some examples of commercial, off-the-shelf software products employed to implement Encode Audio Component 16 according to the invention: Sound Forge (sold by Sonic Foundry, Inc., 1617 Sherman Avenue, Madison, Wis. 53704); Cakewalk Pyro 2003 (sold by Cakewalk, 51 Melcher Street, Boston, Mass. 02210 USA); WinAmp (sold by Nullsoft, 22000 AOL Way, Dulles, Va. 20166); Adobe Premiere (sold by Adobe Systems Incorporated, 345 Park Avenue, San Jose, Calif. 95110-2704, USA); TMPGEnc (sold by Pegasys Inc., 1-16-9 3F Ryogoku Sumida-ku Tokyo 130-0026, Japan); or Womble MPEG2VCR (sold by Womble Multimedia 20333 Bollinger RD, Santa Clara Calif.)

The output file of Encode Audio Component 16 is then synchronously multiplexed with a separately compressed video component file, to be presently described, by Mux 24 to form a final desired composite video data stream of this invention, named Xtream MPEG2 for convenience. By way of illustration and not limitation, the following are some examples of commercial, off-the-shelf software products employed to implement Mux 24 according to the invention: DVDit! (sold by Sonic Solutions, 101 Rowland Way, Novato, Calif. 94945); MyDVD (sold by Sonic Solutions, 101 Rowland Way, Novato, Calif. 94945); or Ulead DVD Workshop (sold by Ulead Systems, Inc, No. 202, TE Building, 4-5-16 Yohga, Setagaya-ku, Tokyo 158-0097, Japan).

Meanwhile, the video component file from Demux 14, for example a D2v file, goes through a Frame Serve 18 to resize the associated video image size to a final desired display resolution, such as 720×480 NTSC, 720×576 PAL, 480×480 NTSC, 480×576 PAL, 320×240 NTSC, 352×288 PAL. By way of illustration and not limitation, the following are some examples of commercial, off-the-shelf software products employed to implement Frame Serve 18 according to the invention: Adobe Premiere (Adobe Systems Incorporated, 345 Park Avenue, San Jose, Calif. 95110-2704); Ulead Video Studio (Ulead, Ulead Systems, 20000 Mariner Ave, Suite #200, Torrance, Calif. 90503; or Vegas Video 3.0 (Sonicfoundry, Sonic Foundry, Inc., 1617 Sherman Avenue, Madison, Wis. 53704).

The Frame Serve 18 employs one of the following three known resize methods, each based upon a different pixel interpolation algorithm, for resizing: (1) BILINEAR wherein the test results show that, while not clearly noticeable, some scenes of the resulting movie titles are shifting under careful observation; (2) BICUBIC wherein the test results show that the resulting movie titles look, being perfect to the naked eyes, exactly like the DVD source from which the movie titles were encoded and is the preferred pixel interpolation algorithm for resizing; and (3) SIMPLE wherein the resulting movie titles look similar to those of BILINEAR for scenes shifting and dull image color.

After image resizing, the resized video component file from Frame Serve 18 gets further compressed by Encode Video Component 20 and this is where, to be presently explained, the present invention makes most of its achievement of a VDCR significantly higher than what is available from the current DVD suppliers in the art while either preserving or achieving a better VDIQ. Similar to other processing blocks of the present optimization software and by way of illustration and not limitation, the following are some examples of commercial, off-the-shelf software products employed to implement Encode Video Component 20 according to the invention: Cleaner (Discreet, The Landmark @ One Market, Suite 500, San Francisco, Calif. 94105 USA); Cinema Craft (Cinema Craft Inc., P. O. Box 16233, Irvine, Calif. 92623-6233USA); Panasonic MPEG2&1 (Panasonic Digital Network Serve Inc., 4-12-8 Sendagaya, Shibuya-ku, Tokyo 151-0051 Japan); or TMPGEnc (Pegasys Inc., 1-16-9 3F Ryogoku Sumida-ku Tokyo 130-0026, Japan).

The further compressed video component file from Encode Video Component 20 above is then processed through a Pull-Down 22 block whereby, through a simple Graphic User Interface (GUI) front-end user interface, RFF or TFF flags are added to form a 23.976 fps MPEG2 data stream with additional batch support allowing the processing of multiple files in a single pass. The thus-processed compressed video component file from Pull-Down 22 is then synchronously multiplexed with the already separately compressed audio component file from Encode Audio Component 16 by Mux 24 to form the final desired composite video data stream Xtream MPEG2. By way of illustration and not limitation, the following is an example of commercial, off-the-shelf software products employed to implement Pull-Down 22 according to the invention: AVID (Avid Technology, Inc., One Park West, Tewksbury, Mass. 01876).

Turning now to the statement that the present invention achieves a VDCR significantly higher than what is available from the current DVD suppliers in the art while either preserving or achieving a better VDIQ, the MPCP that includes a series of desirable parameters such as Set Video Size;Maximum BITRATE; Maximum Average BITRATE/Average BITRATE; and Minimum BITRATE according to TABLE I, are systematically adjusted and, for each set of MPCP so adjusted, the MPEG optimization software 10 is then executed for a set of selected original DVD titles with the resulting processed VDCR and VDIQ collectively judged for a net improvement over the un-processed VDCR and VDIQ from the original DVD titles. Furthermore, the number of the selected original DVD titles and an associated variety of video image types are selected with sufficient breadth such that the resulting improvement of the VDCR and VDIQ will be representative of most of the real-world applications. It is also remarked that, while the VDCR for each case is a single number easily judged for the net improvement over the original, the VDIQ is a far more complex and subjective parameter to quantify. For example, the attributes of VDIQ may include color brilliancy, image sharpness, image smoothness, image stability, smoothness of motion, dynamic range of image intensity, spurious image artifacts, image noise, etc. As a result, while it is theoretically possible to measure the VDIQ with sophisticated instrumentation potentially available in the future, the present invention employs the practical method, albeit tedious and time consuming, of empirical visual judgment of the VDIQ. For clarity of comparison, the designation XDVD will be used to reference any result from the present invention. Thus, the comparison between DVD and XDVD, for a limited, representative set of four (4) DVD titles called Test Subjects selected to facilitate a concise illustration, is shown in TABLE II. However, it must be borne in mind that, before arriving at the results illustrated in TABLE II, in reality, MANY MORE Test Subjects have been tested.

TABLE II

Test Subjects comparison of "present invention"(XDVD) and "standard recommended MPEG2" (DVD

| | Test Subject#1 | Test Subject#2 | Test Subject#3 | Test Subject#4 |
|---|---|---|---|---|
| Image Resolution | NTSC | NTSC | NTSC | NTSC |
| Title | Monsters Inc (Walt Disney) | Lord of the Rings (New Line Home Entertainment) | The Matrix (Warner Brothers) | Ever After (20th Century Fox) |
| Movie Length (minutes) | 93 | 178 | 136 | 120 |
| Raw Data (GB) | Estimated 93 | Estimated 178 | Estimated 136 | Estimated 120 |
| Set Video Size used by DVD: | NOT proportional to | NOT proportional to | NOT proportional to | NOT proportional to |
| (x Value) × (Minutes of Video) | (Minutes of Video) Back-calculated x = 46.24 | (Minutes of Video) Back-calculated x = 42.13 | (Minutes of Video) Back-calculated x = 38.97 | (Minutes of Video) Back-calculated x = 40 |
| Maximum BITRATE used by DVD | 8601 | 9801 | 7500 | 9801 |
| Maximum Average BITRATE/Average BITRATE used by DVD | Average BITRATE 6410 | Average BITRATE 5854 | Average BITRATE 5610 | Average BITRATE 4722 |
| Minimum BITRATE used by DVD | 0 | 0 | 0 | 0 |
| Encoded Data by DVD (GB) | 4.3 | 7.5 | 5.3 | 4.8 |
| Video Compression Ratio (VDCR) by DVD | ~22 | ~24 | ~26 | ~25 |
| Set Video Size used by XDVD: | Proportional to (Minutes of Video) | Proportional to (Minutes of Video) | Proportional to (Minutes of Video) | Proportional to (Minutes of Video) |
| (x Value) × (Minutes of Video) | (x) × (93) with: x = 12 thru 18 | (x) × (178) with: x = 12 thru 18 | (x) × (136) with: x = 12 thru 18 | (x) × (120) with: x = 12 thru 18 |
| Maximum BITRATE used by XDVD | 2200 thru 3300 | 2200 thru 3300 | 2200 thru 3300 | 2200 thru 3300 |
| Maximum Average BITRATE/Average BITRATE used by XDVD | Maximum Average BITRATE 2200 | Maximum Average BITRATE 2200 | Maximum Average BITRATE 2200 | Maximum Average BITRATE 2200 |
| Minimum BITRATE used by XDVD | 300 | 300 | 300 | 300 |
| Encoded Data by XDVD (GB) | 1.17 | 2.2 | 1.7 | 1.4 |
| Video Compression Ratio (VDCR) by XDVD | ~79 | ~81 | ~80 | ~86 |

TABLE II-continued

Test Subjects comparison of "present invention"(XDVD) and "standard recommended MPEG2" (DVD

|  | Test Subject#1 | Test Subject#2 | Test Subject#3 | Test Subject#4 |
|---|---|---|---|---|
| Improvement Factor of VDCR: XDVD over DVD | 3.6 | 3.4 | 3.1 | 3.4 |
| Image Quality Comparison: XDVD vs. DVD | See comments below | See comments below | See comments below | See comments below |

Referring to TABLE II, one of the MPCP parameter "Set Video Size", following the rows lead by the title "Set Video Size used by XDVD: (x Value) X (Minutes of Video)", is determined as follows:

$$\text{Set Video Size} = (x \text{ Value}) \times (\text{Minutes of Video}) \quad (1);$$

where (Minutes of Video) is the length in time of the original video and where x is a fixed numerical factor in the range of 12 through 18.

For convenience, the above "x" is defined as the "Xtream Factor" according to the invention. As defined, this formula includes both the audio and video components where the audio component has been encoded either as MPEG1 Audio Layer II or as AC3 at 224 kbits/sec @ 48 Hz. Through further optimization to be presently described, the following optimal value of Xtream Factor is found to yield a maximum VDCR while maintaining a good VDIQ:

$$\text{Set Video Size} = (13.3) \times (\text{Minutes of Video}) \quad (2);$$

Contrasting to the present invention the existing art does not seem to utilize the length of the original video to determine the Set Video Size, as evidenced by their varying Set Video Sizes from video to video with the same length in time. As a further comparison between XDVD and DVD, a back-calculation is performed according to formula (1) to find an equivalent "x" for each Set Video Size used by DVD. As readily shown in TABLE II, the equivalent "x" used by DVD, ranging from 35 to 50, is substantially higher than that of the Xtream Factor "x", which is in the range of from 12 to 18 with an optimal value of about 13.3.

To illustrate how the optimal value of Xtream Factor is determined according to the invention, the optimization process is now described. In practice, the optimization process is commenced by setting up an initial search range for Xtream Factor for a given Set Video Size. A desirable initial search range according to the invention is in the range of 7–18 with a particularly preferred range of initial search from 12 through 18 based on formula (1). Accordingly, for each of x=7, 8, 9, . . . , 18 and each of a set of selected original DVD titles, the Set Video Size according to formula (1) is calculated and then executed through the MPEG optimization software 10. The resulting processed VDCR and VDIQ for a best improvement over the un-processed VDCR and VDIQ from the original DVD titles is collectively judged and determined.

By way of example and not limitation, the following example is provided to illustrate the optimization process with varying Xtream Factor employing a 23-minute movie segment from "Lord of the Rings" with an original DVD file size of 1.1 GB as shown as Test Subject #2 in TABLE II of the invention:

when x=7, VDIQ-Poor VCD like quality with lots of image blocks artifacts and image shiftingWherein the Encoded Data by XDVD=176 MB (Megabytes);

when x=8, VDIQ-Poor to medium VCD like quality wherein the image blocks artifacts are not as significant as the case of x=7, but the artifacts still very visible and one can still see the image blocks artifacts and image shifting throughout the movie segment Wherein the Encoded Data by XDVD=201 MB;

when x=9, VDIQ-Medium VCD like quality, the image blocks artifacts are smaller yet with less artifacts and image shifting Wherein the Encoded Data by XDVD=226 MB;

when x=10, VDIQ-High VCD like quality, no more image blocks artifacts or image shifting but still some image artifacts in action scenes wherein the Encoded Data by XDVD=250 MB;

when x=11, VDIQ-DVD like quality, although one can still see some artifacts during transitions (scene changes)wherein the Encoded Data by XDVD=275 MB; and when x=16 thru 18: VDIQ-No noticeable difference in quality to the naked eyes wherein the Encoded Data by XDVD=423 MB when x=18.

In view of the above, a recommended Xtream Factor in the range of 12 thru 15 with an optimal value of about 13.3 is selected for best VDIQ while NOT incurring an unnecessarily high Encoded Data size according to the invention.

An optimization process similar to that described above is also followed to obtain an optimal range for each of the other MPCP parameters, "Maximum BITRATE", "Maximum Average BITRATE/Average BITRATE" and "Minimum BITRATE" as is respectively illustrated in TABLE II under the designation XDVD.

Referring again to TABLE II, each of the other MPCP parameters is now contrasted to illustrate the difference between XDVD and DVD according to the invention. As shown in TABLE II, a substantial difference is observed between XDVD and DVD for the parameter of Maximum BITRATE (MBR). Specifically, DVD uses an MBR roughly ranging from 7500 to 15000. Contrasting to the DVD, XDVD uses an MBR in a range of 2200 thru 3300. When the Test Subjects are viewed at an MBR of 2200, the resulting scenes seem a bit blurry. However, as the value of MBR goes higher, the scenes begin to clear up with an MBR of 2600 thru 3000 recommended for best viewing.

A substantial difference is also observed for a selected range of the parameter of Maximum Average BITRATE (MABR)/Average BITRATE (AVBR) between XDVD and DVD. DVD uses an AVBR in a range of 4000 thru 9500. Contrasting to the DVD, XDVD uses a MABR in a range of 2000 thru 2400 with an optimal value set at 2200. Here, when the Test Subjects are viewed from an MABR of 2000 thru 2100, the resulting scenes seem a little blurry plus some image artifacts around still pictures in the Test Subjects and butterfly like noises around action scenes. However, as the value of MABR goes higher, the scenes begin to clear up and an MABR in the range of 2120 thru 2300 is recommended for best viewing.

For the parameter of Minimum BITRATE (MNBR), DVD uses a MNBR of 0. Contrasting to the DVD, XDVD uses a MNBR of 300.

In summary, the employment of these optimized MPCP parameters in the Encode Video Component 20 of the MPEG optimization software 10 by XDVD results in a VDCR that is at least 200% higher than what is achievable by DVD. This can be readily seen by comparing the testing results summarized in TABLE II. For example, for Test Subject #1 (Monsters Inc), DVD yields a VDCR of 22 while XDVD yields a VDCR of 79, which is 360% higher. For another example, for Test Subject #3 (The Matrix) DVD yields a VDCR of 26 while XDVD yields a VDCR of 80, which is 310% higher. As remarked before, the improvement of VDCR by the present invention is not at the cost of and without any compromise of quality of the video images because of the ability of XDVD to maintain or improve the corresponding VDIQ of DVD.

The following examples are set forth to further illustrate the ability of XDVD to maintain or improve the corresponding VDIQ of DVD employing Test Subjects #1–#4 of TABLE II according to the invention:

(i) VDIQ comparison for Test Subject #1 between fXDVD and DVD:

A side by side viewing of the DVD and XDVD was conducted for Test Subject #1 from beginning to the end. There was no noticeable difference when viewed by the naked eyes. Test Subject#1 was also viewed for image artifacts in dark scenes, action scenes and high color scenes. There were no artifacts or any defects with XDVD;

(ii) VDIQ comparison for Test Subject #2 between XDVD and DVD:

The Test Subject #2 contains action scene at the beginning of this movie, which would be one of the hardest scene to compress. This scene has most of the requirements such as darkness, action (battle) and crowds of people to test compression. Usually one can see artifacts when the scene fits the criteria of being dark, high motion and having crowds of people. When viewing the first chapter of this movie, which fits the criteria, XDVD passes the test and matches the corresponding quality of DVD. Specifically, there were no image artifacts from XDVD around the head area of the crowds of people scene that is common from some DVDs and that is most common when a DVD movie is duplicated with other formats like VCD or SVCD. In Chapter two of the Test Subject #2, the Shire has great sceneries with background of trees and other greenery which makes it easy to detect artifacts. However, when viewed with XDVD there were no such artifacts either.

(iii) VDIQ comparison for Test Subject #3 between XDVD and DVD:

This movie was chosen because of the action scenes. The second chapter was a chase scene that is considered a high motion scene. Normally one can easily detect artifacts in high motion scenes but with the XDVD this scene was perfect! This scene was matched exactly, all the way to the green tint that indicates when the actors/persons are in the Matrix. The next action scene to watch was the lobby-shooting spree where there were a good many people and lots of motion but still no artifacts were seen with XDVD.

In addition, when viewed by the naked eyes there was no difference between DVD and XDVD.

(iv) VDIQ comparison for Test Subject #4 between XDVD and DVD:

This movie of drama and romance has a little bit of everything including scenery, action, crowds of people and a different time/place. During the scenes of horse riding and waterfall, the XDVD did not waver. The Cinderella scene with lots of people and dancing in darkness also has no artifacts with XDVD.

As described, an MPEG optimization software using a set of optimized MPEG2 Control Parameters (MPCP) and associated method for obtaining the same are disclosed to realize a Video Compression Ratio (VDCR), under the designation XDVD, that is significantly higher than what is achieved by the current DVD suppliers in the art. Equally importantly, the XDVD is demonstrated with a number of exemplary Test Subjects to be capable of maintaining or improving the corresponding Video Image Quality (VDIQ) of DVD. However, for those skilled in this field, the preferred embodiments can be easily adapted and modified to suit additional applications without departing from the spirit and scope of this invention. For example, the present invention can be expected to be applicable to a more generalized family of MPEG video compression technologies including MPEG-1, MPEG-2, MPEG-4, and MPEG-7. While MPEG-4 is the standard of multimedia for the fixed and mobile access of the web and MPEG-7 is the standard for description and search of audio and visual contents, both MPEG-4 and MPEG-7 are based upon the MPEG-2 technology. This means that our present invention can be expected to be applicable to MPEG-4 and MPEG-7 to achieve corresponding improvements similar to what has been disclosed herein. It should be noted that all the corresponding DVD and XDVD media for the Test Subjects #1–#4 described above are available for demonstration upon request.

Thus, it is to be understood that the scope of the invention is not limited to the disclosed embodiments. On the contrary, it is intended to cover various modifications and similar arrangements based upon the same operating principle and method. The scope of the claims, therefore, should be accorded the broadest interpretations so as to encompass all such modifications and similar arrangements.

What is claimed are the following:

1. An MPEG Optimization Software (MOPSW) product for further maximizing a Video Compression Ratio (VDCR) while maintaining an output Video Image Quality (VDIQ) of an Input MPEG file (IMPEG) being an MPEG2 file that is a composite video and audio source file having:
   an audio component,
   a video component,
   a Set Video Size,
   a Maximum BITRATE,
   a selection and a value of Maximum Average BITRATE or Average BITRATE,
   a Minimum BITRATE, and
   a set of adjustable MPEG control parameters affecting both VDCR and VDIQ,
      wherein said Set Video Size is set according to the following formula:

Set Video Size=$(x)\times$Minutes of Video), where Minutes of Video is the length in time of the original video corresponding to said MPEG2 file, and
      where x is a fixed numerical factor in the range of 12 through 18, and the MOPSW product comprising:

an encode video component module, employing said set of adjustable MPEG control parameters being set within a pre-determined range, to compress said video component into a further compressed video component, wherein said pre-determined range for each of said set of adjustable MPEG control parameters is so selected that, upon multiplexing said further compressed video component with a separate further compressed audio component from said audio component, a final composite video data stream is formed having a VDCR significantly higher than that of said IMPEG while maintaining a VDIQ that is at least comparable to that of said IMPEG;

2. The MOPSW product of claim 1 further comprising a frame serve module, preceding said encode video component module, for resizing a video image size of said video component to a final display resolution before sending a correspondingly resized video component to said encode video component module for further processing.

3. The MOPSW product of claim 2 further comprising a pull-down module, following said Encode Video Component module, for adding frame rate-compensation flags to said further compressed video component before multiplexing said further compressed video component with said further compressed audio component into said final composite video data stream.

4. The MOPSW product of claim 3 further comprising a demux module, preceding said frame serve module, for separating said IMPEG into said audio component and said video component.

5. The MOPSW product of claim 4 further comprising an encode audio component module, following said demux module, for further compressing said audio component into said further compressed audio component.

6. The MOPSW product of claim 5 further comprising a mux module, following both said encode audio component module and said pull-down module, for synchronously multiplexing said further compressed video component, including adding said frame rate-compensation flags, with said further compressed audio component to form said final composite video data stream.

7. The MOPSW product of claim 6 further comprising a video source module, preceding said demux module, for accepting said IMPEG.

8. The MOPSW product of claim 7, wherein said IMPEG has a format that is MPEG1, MPEG2, MPEG4, MPEG7, Audio Video Interleave (AVI) or DVD Video Object (VOB).

9. The MOPSW product of claim 1, wherein said x is set at an optimal value of about 13.3.

10. The MOPSW product of claim 1, wherein said Maximum BITRATE is set at a value in the range of 2200 through 3300.

11. The MOPSW product of claim 10, wherein said Maximum BITRATE is further set at a value within an optimal range of 2600 through 3000.

12. The MOPSW product of claim 10, wherein said selection and value of Maximum Average BITRATE or Average BITRATE are set at a value in the range of 2000 through 2400.

13. The MOPSW product of claim 12, wherein said Maximum Average BITRATE is further set at an optimal value of about 2200.

14. The MOPSW product of claim 12, wherein said Minimum BITRATE is set at 300.

15. An optimization method for maximizing a VDCR while maintaining an acceptable VDIQ of an IMPEG that is a composite video and audio source file and having:

an audio component, a video component, a set of adjustable MPEG control parameters affecting both VDCR and VDIQ of said IMPEG, and the optimization method comprising:

a) further compressing said audio component into a further compressed audio component;

b) resizing a video image size of said video component, to a final desired display resolution, into a resized video component;

c) further compressing said resized video component, employing said set of adjustable MPEG control parameters, into a further compressed video component;

d) adding frame rate-compensation flags to said further compressed video component;

e) synchronously multiplexing said further compressed video component, including adding said frame rate-compensation flags, with said further compressed audio component to form a final composite video data stream;

f) calculating a VDCR and measuring a VDIQ associated with said final composite video data stream; and g) iteratively repeating steps c. through f., each time using a systematically adjusted new set of said adjustable MPEG control parameters, until a highest possible value of VDCR is achieved with an accompanying VDIQ that is acceptable for an application under consideration.

16. The optimization method of claim 15, wherein said IMPEG has a file format that is one of MPEG1, MPEG2, MPEG4, or MPEG7, Audio Video Interleave (AVI) or DVD Video Object (VOB).

17. The optimization method of claim 15, wherein said IMPEG is an MPEG2 file with said set of adjustable MPEG control parameters being MPEG2 Control Parameters (MPCP) that further comprising the following parameters:

Set Video Size;

Maximum BITRATE;

selection and value of Maximum Average BITRATE or Average BITRATE; and

Minimum BITRATE.

18. The optimization method of claim 17, wherein said Set Video Size is set according to the following formula:

$$\text{Set Video Size} = (x) \times (\text{Minutes of Video}),$$

where Minutes of Video is the length in time of the original video corresponding to said MPEG2 file, and x is an adjustable numerical factor employed in said optimization method.

* * * * *